United States Patent [19]

Mon

[11] 4,246,935

[45] Jan. 27, 1981

[54] TEMPERATURE-COMPENSATED LAMINAR PROPORTIONAL AMPLIFIER

[75] Inventor: George Mon, Silver Spring, Md.

[73] Assignee: The United States of America as represented by the Secretary of the Army, Washington, D.C.

[21] Appl. No.: 14,503

[22] Filed: Feb. 23, 1979

[51] Int. Cl.[3] .......... F16K 1/18

[52] U.S. Cl. .......... 137/840

[58] Field of Search .......... 137/804, 822, 834, 835, 137/840, 836

[56] References Cited

U.S. PATENT DOCUMENTS

| | | | |
|---|---|---|---|
| 3,452,771 | 7/1969 | Kirshner et al. | 137/835 |
| 3,468,323 | 9/1969 | Jones | 137/835 X |
| 3,474,805 | 10/1969 | Swartz | 137/835 X |
| 3,487,845 | 1/1970 | Stern | 137/822 |
| 3,540,463 | 11/1970 | Meyer | 137/836 |
| 3,623,053 | 11/1971 | Meyer | 137/804 |
| 3,942,558 | 3/1976 | Honda et al. | 137/829 |
| 3,971,257 | 7/1976 | Drzewiecki | 137/840 |

*Primary Examiner*—William R. Cline
*Attorney, Agent, or Firm*—Nathan Edelberg; Robert P. Gibson; Saul Elbaum

[57] ABSTRACT

A temperature-compensated laminar proportional amplifier having an interaction chamber laterally extended into a plurality of vented recesses and a power nozzle for issuing fluid into the interaction chamber. A linear resistor is fluidically coupled between the fluid input of the power nozzle and the fluid outputs of the plurality of vented recesses for bypassing fluid around the power nozzle.

6 Claims, 6 Drawing Figures

TEMPERATURE-COMPENSATED LAMINAR PROPORTIONAL AMPLIFIER

RIGHTS OF THE GOVERNMENT OF THE UNITED STATES

The invention described herein may be manufactured, used and licensed by or for the United States Government for governmental purposes without the payment to me of any royality thereon.

BACKGROUND OF THE INVENTION

The present invention relates generally to fluid amplifiers, and more particularly to improvements in the temperature characteristics of such devices.

Fluidic devices are well known as a means for providing control functions for moving fluid streams. One type of fluidic device currently in use is the laminar proportional amplifier wherein a stream of fluid, called the supply stream, is input at an input port. The stream passes across a widened chamber, designed to prevent the stream from clinging to either of the channel walls, and arrives at a fork consisting of the two outgoing channels separated by a pointed structure called the splitter. If the power stream has not been disturbed and hits the splitter head-on, the stream will be divided in two, half of the fluid passing into one outlet channel and half into the other. As the power stream enters the system, it runs past two control jets, one on each side of the amplifier. When one of the jets is turned on and the control stream hits the supply stream with a certain pressure, it will deflect the supply stream by a certain amount. The output in the corresponding channel represents an amplification of the energy applied by the control jet, and the gain is equal to the ratio between the differential output pressure and the differential control pressure. It is necessary to specify the load conditions as this may modify the flow patterns within the device thereby altering the gain. Pressure gain is usually quoted for zero output flow and is referred to as the blocked load condition. Since the degree of the deflection of the supply stream is proportional to the pressure difference across the supply jet, the system is called a proportional amplifier. Since the flow of the supply stream through the chamber is not turbulent but is instead, laminar, the device is called a laminar proportional amplifier. The prior art has conventionally used the laminar proportional amplifier (henceforth referred to as LPA) as an analog device, serving to amplify signals through a continuum of pressures between two bounded pressure values.

The LPA operating in hydraulic fluid is limited in temperature range. Over an operating temperature range of 4.4° to 70° C., the kinematic viscosity of 5606 hydraulic oil changes from 40 to 7 centistoke, or about six times. This large change of viscosity presents a problem to the present LPA design because the LPA cannot operate satisfactorily over this temperature range because of variations in pressure gain within the Reynolds number range. In order to maintain the pressure gain of the LPA within an acceptable level under these conditions, temperature compensation is needed.

BRIEF SUMMARY OF THE INVENTION

It is therefore one object of the present invention to provide an improved LPA wherein the pressure gain is compensated for the effects of temperature change.

Briefly in accordance with the invention, a temperature-compensated laminar proportional amplifier is provided which includes a laminar proportional amplifier and means for bypassing fluid around the power nozzle of the laminar proportional amplifier to compensate the pressure gain of the laminar proportional amplifier for the effects of temperature. The temperature compensation is achieved by decreasing the flow rate through the power nozzle, and by increasing the bias pressure, as the temperature increases. The fluid bypassing means is a linear resistor fluidically coupled between the fluid input of the power nozzle and the fluid outputs of a plurality of vented recesses of the laminar proportional amplifier.

The foregoing as well as other objects, features, and advantages of the present invention will become more apparent from the following detailed description taken in conjunction with the appended drawings.

DETAILED DESCRIPTION OF THE PREFERRED EMBODIMENT

Figure 1:
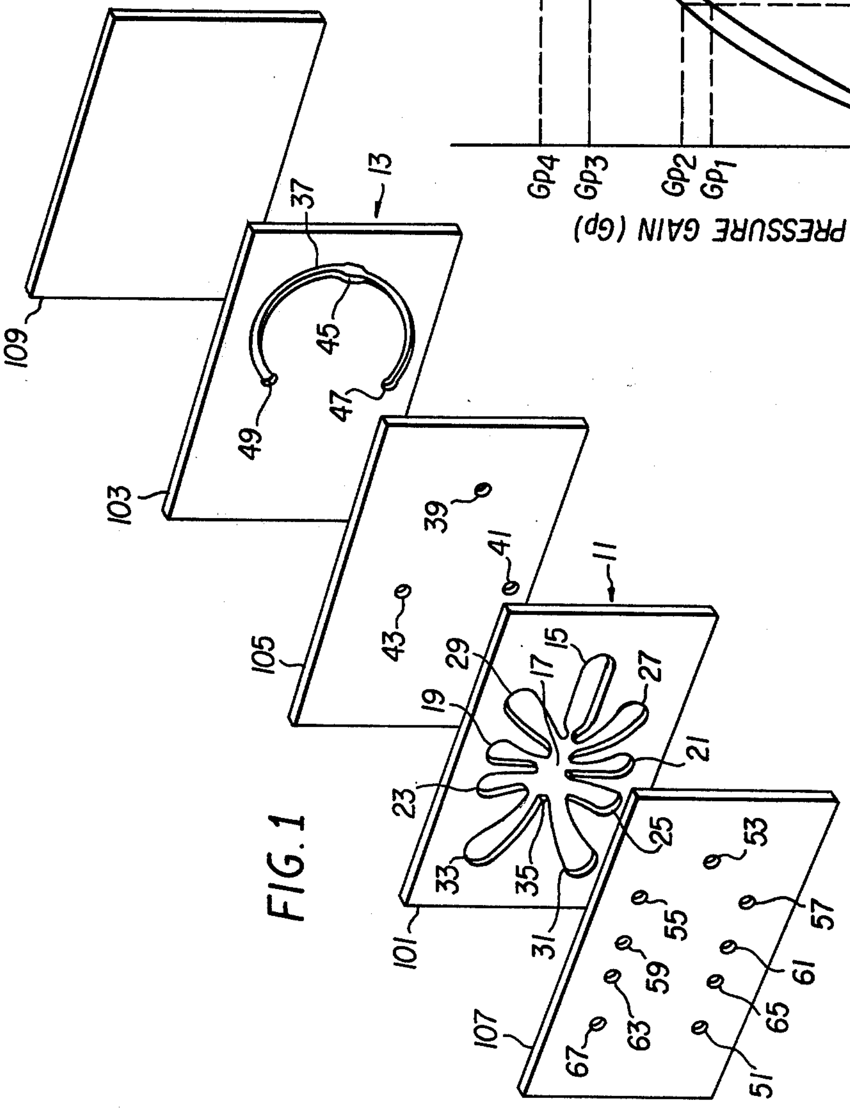
FIG. 1 is an exploded perspective view of the temperature-compensated LPA in accordance with this invention.

Referring now to the drawing, FIG. 1 illustrates the temperature-compensated LPA of the present invention.

As shown in FIG. 1, the temperature-compensated LPA is comprised of an LPA 11 and fluid bypassing means 13 for compensating the pressure gain of the LPA for the effects of temperature change.

The LPA is comprised of a plate 101. Plate 101 includes a power nozzle 15 for issuing fluid into an interaction chamber 17. The interaction chamber is laterally extended into a bottom pair of vented recesses 19 and 21 and a top pair of vented recesses 23 and 25. A left input control nozzle 27 issues into the interaction chamber 17 on a axis intersecting with the prime axis of the power nozzle 15. A right input control nozzle 29 issues into the interaction chamber on an opposing axis intersecting with the axis of the power nozzle 15. A left output passage 31 opens into the interaction chamber 17 on an axis which is to the left of the prime axis of the power nozzle 15. A right output passage 33 opens into the interaction chamber on an axis which is to the right of the prime axis of the power nozzle 15. The left and right output passages 31 and 33 are set symmetrically about the prime axis of the power nozzle 15 and are separated by a splitter 35.

The fluid bypassing means 13 is comprised of a plate 103. Plate 103 includes an arcuate channel 37 of rectangular cross-section which is symmetric about an axis coincident with the prime axis of the power nozzle 29 in plate 101.

In order to insure proper operation of the temperature-compensated LPA, coupling plate 105 and cover plates 107 and 109 are provided. Coupling plate 105 is positioned between plates 101 and 103 and includes coupling holes 39, 41 and 43. Coupling hole 39 fluidically couples the input of the power nozzle 15 in plate 101 to the vertex 45 of the arcuate channel 37 in plate 103, while coupling holes 41 and 43 fluidically couple the outputs of the bottom pair of vented recesses 19 and 21 to the opposite ends 47 and 49 of the arcuate channel 37 in plate 103. Cover plate 109 is aligned with and on the opposite side of plate 103 and serves to isolate the arcuate channel from the atmosphere. Cover plate 107 is positioned adjacent to front side of plate 101 (in accordance with FIG. 1) and includes nine coupling holes, 51, 53, 55, 57, 59, 61, 63, 65 and 67. Coupling hole 51 fluidically couples the left output passage 31 of the LPA 11 in plate 101 to a suitable utilization device, such as a pressure indicator, other fluid device, etc., while coupling hole 53 fluidically couples a fluidic source of supply under constant pressure $P_t$ (not shown) to the input of power nozzle 15 of the LPA 11 in plate 101. Coupling hole 55 fluidically couples a source of control or signal fluid (not shown) to the right input control nozzle 29. If a push-pull input signal is utilized, then the other output signal of the push-pull source of control fluid is coupled through coupling hole 57 to the left input control nozzle 27. However, for the purposes of explanation, it is assumed that there is a difference between the left and right control signals with a net positive signal at the right input control nozzle 55. Coupling holes 59, 61, 63 and 65 fluidically couple a common reservoir at ambient pressure $P_a$ to the outputs of the bottom pair and top pair of vented recesses 19, 21, 23 and 25 to provide uniform pressure in the interaction chamber 17.

The operation of the temperature-compensated LPA will now be explained. Pressurized fluid is fed at a constant flow rate $Q_t$ from the supply source to the input of the power nozzle 15 in plate 101 and to the vertex 45 of the arcuate channel 37 in plate 103 via coupling hole 53 in cover plate 107 and coupling hole 39 in coupling plate 105. Under these circumstances, one part of the total of the pressurized fluid from the supply source is fed at a flow rate $Q_s$ through the power nozzle 15 in plate 101 and issues into the interaction chamber 17 in the form of a laminar power jet. The laminar power jet hits the splitter 35 and divides through the left and right output passages, any excess fluid not exiting through the output passages being exhausted through the top pair of vented recesses 23 and 25. In the absence of an input signal from the right input control nozzel 29, there will be a small bias pressure created across the laminar power jet. As the input signal from the right input control nozzle 29 increases slightly from zero, the laminar power jet is deflected towards the left, increasing the output signal developed in the left output passage 31. There is a proportional relationship between the input and output signals; that is, the greater the input signal or pressure from the right input control nozzle 29, the greater the deflection of the laminar power jet towards the output passage 31 and the greater the signal or pressure developed at the utilization device.

In the meantime, the other part of the total pressurized fluid from the supply source is fed at a flow rate $Q_b$ through the arcuate channel 37, issuing therefrom via coupling holes 41 and 43 in coupling plate 105 into the bottom pair of vented recesses of the LPA 11 in plate 101 so as to bypass the power nozzle 15. Excess fluid not exiting through the coupling holes 59 and 61 in cover plate 107 spills back towards the left and right input control nozzles 27 and 29 of the LPA 11 in plate 101 and increases the bias pressure across the laminar power jet.

The resistance for flow $R_b$ of the arcuate channel 37 of the fluid bypassing means 13 is defined by $$R_b=(P_t-P_a)/Q_b$$

Reference may be made to Harry Diamond Labs Technical Note HDL-TM-78-16 entitled "temperature Compensation of Laminar Proportional Amplifiers Using a Linear Resistor Bypass" herein incorporated by reference, wherein it is shown that resistance $R_b$ can be made approximately linear, that is, dependent only on the geometry and viscosity of the working fluid and not on the flow, if the following relationship is maintained between the geometric parameters and the flow rate:

$$\mu LD/h^4 >> KPQ_b/(bh)^2$$

where

- b=channel width,
- h=channel depth,
- L=length of the channel,
- $\mu$=dynamic viscosity of the fluid,
- $\sigma$=local aspect ratio ($\sigma$=h/b),
- p=density of the fluid,
- K=flow development coefficient (a constant less than unity), and $$D = \frac{1}{\frac{\sigma}{12} + \frac{2}{\pi\ 5} \sum_{m=1}^{\infty} \frac{(1-\cos m\pi)^2}{m^5} \ \frac{(-2e^{m\sigma\pi} - e^{-m\sigma\pi} + 4)}{e^{m\sigma\pi} - e^{-m\sigma\pi}}}.$$

Under these circumstances $$R_b=\mu LD/h^4$$

Figure 2:
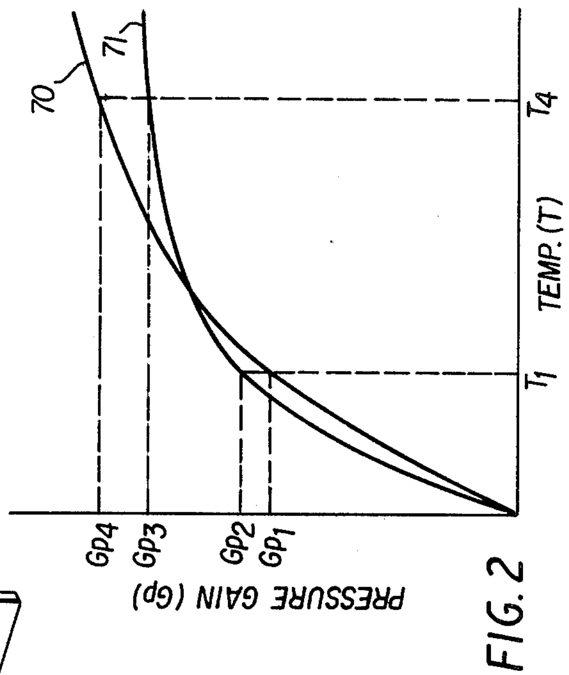
FIG. 2 is a graph of the blocked load pressure gain versus temperature for the prior art LPA and for the temperature-compensated LPA in accordance with this invention.

When the temperature-compensated LPA of the invention is compared to the prior art LPA, the difference is blocked load pressure gain characteristics is extremely marked as may be seen from comparison of curves 70 and 71 of FIG. 2. In FIG. 2, the abcissa represents the temperature T in degrees Celcius and the ordinate represents the blocked load pressure gain. The pressure gain of the conventional LPA corresponds to curve 70. The pressure gain of the temperature-compensated LPA of the invention corresponds to curve 71. Thus, the temperature-compensated LPA of the invention exhibits a much smaller variation in blocked load pressure gain over the operating temperature range ($T_1$ through $T_4$ in FIG. 2) than existing laminar proportional amplifiers.

In the device of FIG. 1, two mechanisms contribute to compensating the pressure gain of the LPA for the effects of temperature change. They are: (1) the temperature dependence of the Reynolds Number; and (2) the temperature dependence of the bias pressure.

Figure 3:
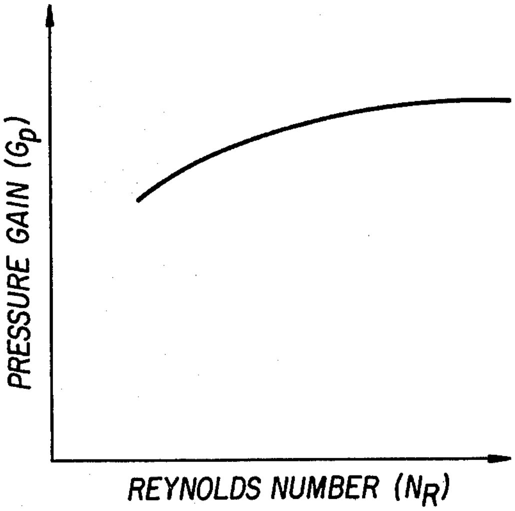
FIG. 3 is a graph of the blocked load pressure gain versus Reynolds Number for the temperature-compensated LPA in accordance with this invention.
Figure 4:
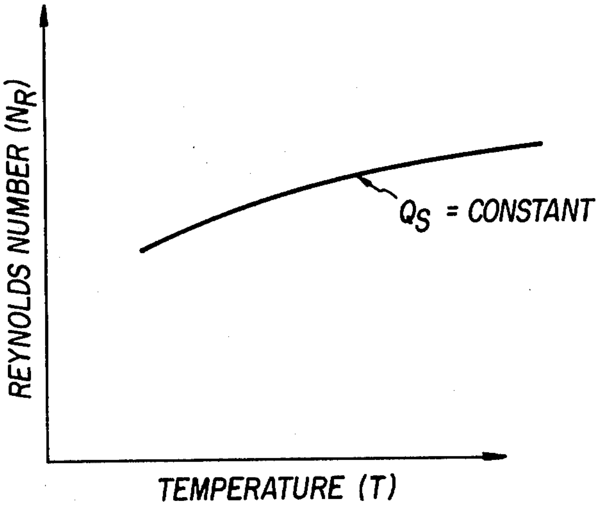
FIG. 4 is a graph of the Reynolds Number versus temperature for the temperature-compensated LPA in accordance with this invention.

The blocked load pressure gain $G_p$ of the LPA can be characterized by the Reynolds Number of the power nozzle $N_R=Q_s/b_s\nu$ defined by the flow rate $Q_s$ of the fluid through the power nozzle, the width $b_s$ of the power nozzle, and the kinematic viscosity $\nu$ of the fluid. As illustrated in FIG. 4 at a constant flow rate $Q_s$, $N_R$ increases as the fluid temperature increases because $\nu$ decreases. Referring to FIG. 3, in general, $G_p$ increases with $N_R$. The device of FIG. 1 maintains variation of $N_R$ in a manageable range to reduce the increase of $G_p$ with temperature by decreasing the flow rate $Q_s$ as the fluid temperature increases, and by increasing the flow rate as the fluid temperature decreases. In other words, the ratio $Q_s/\nu$ is maintained at a substantially constant level. Since $R_b$ is proportional to the dynamic viscosity $\mu$, this occurs naturally as a result of the supply source flow being split between the power nozzle 15 and the arcuate channel 37 in inverse proportion to their respective resistances, that is, so $$Q_s/Q_b=R_b/R_s.$$

Reference may be made to Harry Diamond Labs Technical Note HDL-TM-78-16, cited above, for further mathematical analysis.

Figure 5:
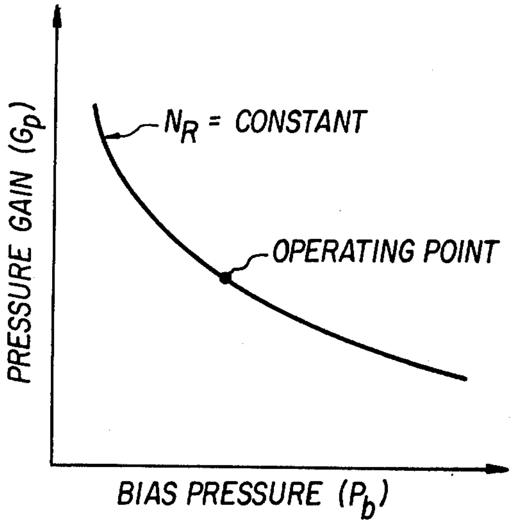
FIG. 5 is a graph of the blocked load pressure gain versus bias pressure at constant Reynolds Number for the temperature-compensated LPA in accordance with this invention.
Figure 6:
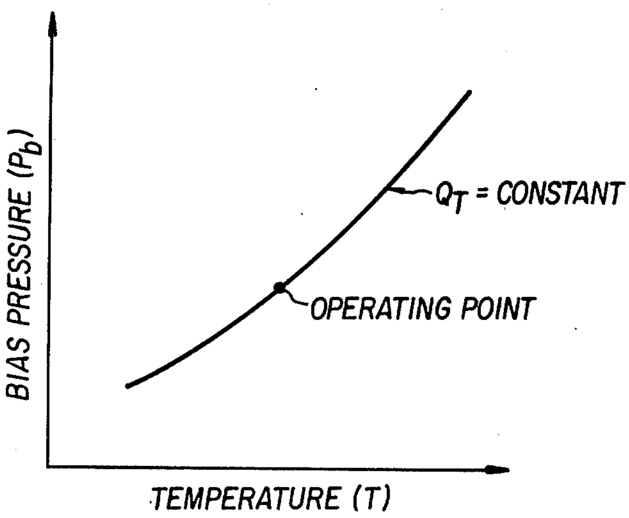
FIG. 6 is a graph of the bias pressure versus fluid temperature at constant supply flow rate for the temperature-compensated LPA in accordance with this invention.

The blocked load pressure gain $G_p$ of the LPA can also be characterized by the bias pressure $P_b$ across the laminar power jet. In the device of FIG. 1, $Q_s$ decreases as the fluid temperature increases. For constant flow rate $Q_t$ from the supply source, it follows that $Q_b$ increases as the temperature increases. As illustrated in FIG. 6, the bias pressure $P_b$ increases as the temperature increases because the spill back of fluid from the ends of the arcuate channel 37 towards the input control nozzles 27 and 29 of the LPA increases with $Q_b$. Referring to FIG. 5, in general, $G_p$ decreases as $P_b$ increases. Thus, the device of FIG. 1 increases the bias pressure $P_b$ as the temperature increases to further reduce the increase of gain $G_p$ with temperature.

I wish it to be understood that I do not desire to be limited to the exact details of construction shown and described, for obvious modifications can be made by a person skilled in the art.

What is claimed as new and desired to be secured by letters patent of the United States is:

1. A temperature-compensated laminar proportional amplifier, said laminar proportional amplifier including an interaction chamber, control nozzles issuing into said interaction chamber, a power nozzle for issuing fluid into the interaction chamber, a source of fluid providing fluid flow to said power nozzle, wherein the interaction chamber is laterally extended into a plurality of opposed vented recess having outputs to a common pressure source; and fluid bypassing means comprising a linear resistance to fluid flow fluidically coupled between the source of fluid for the power nozzle and the fluid outputs of the plurality of vented recesses whereby fluid is passed from said source around the power nozzle to compensate the pressure gain of the laminar proportional amplifier for the effects of temperature.

2. The temperature compensated laminar proportional amplifier recited in claim 1 wherein:

the fluid bypassing means is a channel the resistance to flow of which is substantially independent of the magnitude of the flow rate through the channel.

3. The temperature compensated laminar proportional amplifier recited in claim 2 wherein:

the resistance of the channel to flow is substantially dependent only on the geometry of the channel and the viscosity of the working fluid.

4. The temperature compensated laminar proportional amplifier recited in claim 3 wherein:

the channel is of rectangular cross-section.

5. The temperature compensated laminar proportional amplifier recited in claim 4 wherein:

the channel is arcuate and symmetric about an axis coincident with the prime axis of the power nozzle.

6. The temperature compensated laminar proportional amplifier recited in claim 4 wherein:

said pair of control nozzles issue into the interaction chamber on an axis intersecting with the prime axis of the power nozzle upstream of the plurality of vented recesses.

* * * * *